(12) United States Patent
Kurohata et al.

(10) Patent No.: US 7,576,873 B2
(45) Date of Patent: Aug. 18, 2009

(54) IMAGE PRINTING APPARATUS

(75) Inventors: Takao Kurohata, Tokyo (JP); Yoshihisa Kamata, Tokyo (JP); Minoru Asakawa, Tokyo (JP)

(73) Assignee: Konica Minolta Holdings Inc., Tokyo (JP)

( * ) Notice: Subject to any disclaimer, the term of this patent is extended or adjusted under 35 U.S.C. 154(b) by 895 days.

(21) Appl. No.: 10/789,497

(22) Filed: Feb. 26, 2004

(65) Prior Publication Data

US 2004/0174551 A1    Sep. 9, 2004

(30) Foreign Application Priority Data

Mar. 3, 2003    (JP)    ............... 2003-055501

(51) Int. Cl.
*G06K 15/02*    (2006.01)
*G06F 15/00*    (2006.01)

(52) U.S. Cl. .................. 358/1.13; 358/1.12; 358/1.18; 399/407

(58) Field of Classification Search ............... 358/1.16, 358/1.2, 1.15, 1.18, 1.12; 101/484; 345/100; 399/407, 82, 83
See application file for complete search history.

(56) References Cited

U.S. PATENT DOCUMENTS

| | | | | |
|---|---|---|---|---|
| 4,860,115 | A * | 8/1989 | Ogura | 358/443 |
| 5,808,747 | A * | 9/1998 | Telle | 358/296 |
| 5,881,337 | A * | 3/1999 | Higashikawa et al. | 399/82 |
| 6,160,922 | A * | 12/2000 | Hayashi | 382/274 |
| 6,404,994 | B1 * | 6/2002 | Kawai et al. | 399/6 |
| 6,621,993 | B2 * | 9/2003 | Tamai et al. | 399/82 |
| 6,632,035 | B1 * | 10/2003 | Kawamoto | 400/61 |
| 6,924,826 | B1 * | 8/2005 | Nakagiri et al. | 715/700 |
| 2002/0051207 | A1 * | 5/2002 | Ohkubo et al. | 358/1.18 |
| 2002/0054008 | A1 * | 5/2002 | Aikawa | 345/100 |
| 2002/0090223 | A1 * | 7/2002 | Ohtani | 399/82 |

(Continued)

FOREIGN PATENT DOCUMENTS

JP    7-281558 A    10/1995

(Continued)

OTHER PUBLICATIONS

Japanese Office Action dated Jan. 6, 2009 (3 pages), and English translation thereof (3 pages) issued in counterpart Japanese Application No. 2004-025269.

*Primary Examiner*—King Y Poon
*Assistant Examiner*—Allen H Nguyen
(74) *Attorney, Agent, or Firm*—Frishauf, Holtz, Goodman & Chick, P.C.

(57) ABSTRACT

This invention is directed to an image printing apparatus which prints an original image as image information on a recording sheet and performs postprocessing on the recording sheet after printing operation. According to the image printing apparatus of the invention, image printing conditions include conditions concerning postprocessing to be executed by a punch unit and postprocessing device and selection information of a main tray or sub-tray. The image printing conditions are stored after being set as individual image printing conditions for each image information and linked to the image information. When image printing conditions are to be read out by a page readout unit, such individual image printing conditions are read out together with image information, printing and postprocessing are executed for each image information, i.e., each original image.

9 Claims, 11 Drawing Sheets

U.S. PATENT DOCUMENTS

| | | | |
|---|---|---|---|
| 2003/0016391 A1* | 1/2003 | Tamura | 358/1.16 |
| 2004/0107854 A1* | 6/2004 | Nakatani et al. | 101/484 |

FOREIGN PATENT DOCUMENTS

| | | |
|---|---|---|
| JP | 8-152748 A | 6/1996 |
| JP | 9-151024 A | 6/1997 |
| JP | 2002-099179 A | 4/2002 |

* cited by examiner

| SETTING PAGE | CONTENTS OF POSTPROCESSING | PAPER DELIVERY POSITION | DELIMITER INFORMATION | NUMBER OF COPIES |
|---|---|---|---|---|
| 1 | EXECUTION OF PUNCH PROCESSING | SUB-TRAY | YES | 1 |
| 2 | ↑ | ↑ | YES | 2 |
| 3 | NONEXECUTION OF PUNCH PROCESSING | MAIN TRAY | YES | 3 |
| 4 | EXECUTION OF PUNCH PROCESSING | ↑ | YES | 4 |
| 5 | NONEXECUTION OF PUNCH PROCESSING | ↑ | YES | 5 |

FIG. 7A

| SETTING PAGE | CONTENTS OF POSTPROCESSING | PAPER DELIVERY POSITION | DELIMITER INFORMATION | NUMBER OF COPIES |
|---|---|---|---|---|
| 1 | EXECUTION OF PUNCH PROCESSING | SUB-TRAY | NO | 2 |
| 2 | ↑ | ↑ | NO | ↑ |
| 3 | ↑ | ↑ | YES | ↑ |
| 4 | NONEXECUTION OF PUNCH PROCESSING | MAIN TRAY | NO | 2 |
| 5 | ↑ | ↑ | YES | ↑ |

FIG. 7B

| SETTING PAGE | CONTENTS OF POSTPROCESSING | PAPER DELIVERY POSITION | DELIMITER INFORMATION | NUMBER OF COPIES |
|---|---|---|---|---|
| 1 | STAPLING AT ONE UPPER LEFT POSITION | MAIN TRAY | NO | 2 |
| 2 | ↑ | ↑ | NO | ↑ |
| 3 | ↑ | ↑ | YES | ↑ |
| 4 | STAPLING AT ONE UPPER LEFT POSITION | MAIN TRAY | NO | 2 |
| 5 | ↑ | ↑ | YES | ↑ |

FIG. 7C

| SETTING PAGE | CONTENTS OF POSTPROCESSING | PAPER DELIVERY POSITION | DELIMITER INFORMATION | NUMBER OF COPIES |
|---|---|---|---|---|
| 1 | STAPLING AT ONE UPPER LEFT POSITION | MAIN TRAY | NO | 2 |
| 2 | ↑ | ↑ | NO | ↑ |
| 3 | ↑ | ↑ | YES → NEGLECT | ↑ |
| 4 | STAPLING AT ONE UPPER LEFT POSITION | MAIN TRAY | NO | 2 |
| 5 | ↑ | ↑ | YES → NEGLECT | ↑ |

FIG. 8A

| SETTING PAGE | CONTENTS OF POSTPROCESSING | PAPER DELIVERY POSITION | DELIMITER INFORMATION | NUMBER OF COPIES |
|---|---|---|---|---|
| 1 | STAPLING AT ONE UPPER LEFT POSITION | MAIN TRAY | NO | 10 |
| 2 | ↑ | ↑ | ↑ | ↑ |
| 3 | ↑ | ↑ | ↑ | ↑ |
| 4 | ↑ | ↑ | ↑ | ↑ |
| 5 | ↑ | ↑ | YES | ↑ |

FIG. 8B

| SETTING PAGE | CONTENTS OF POSTPROCESSING | PAPER DELIVERY POSITION | DELIMITER INFORMATION | NUMBER OF COPIES |
|---|---|---|---|---|
| 1 | STAPLING AT ONE UPPER LEFT POSITION | MAIN TRAY | NO | 10 |
| 2 | ↑ | ↑ | ↑ | ↑ |
| 3 | ↑ | ↑ | ↑ | ↑ |
| 4 | ↑ | ↑ | ↑ | ↑ |
| 5 | ↑ | ↑ | YES → NEGLECT | ↑ |

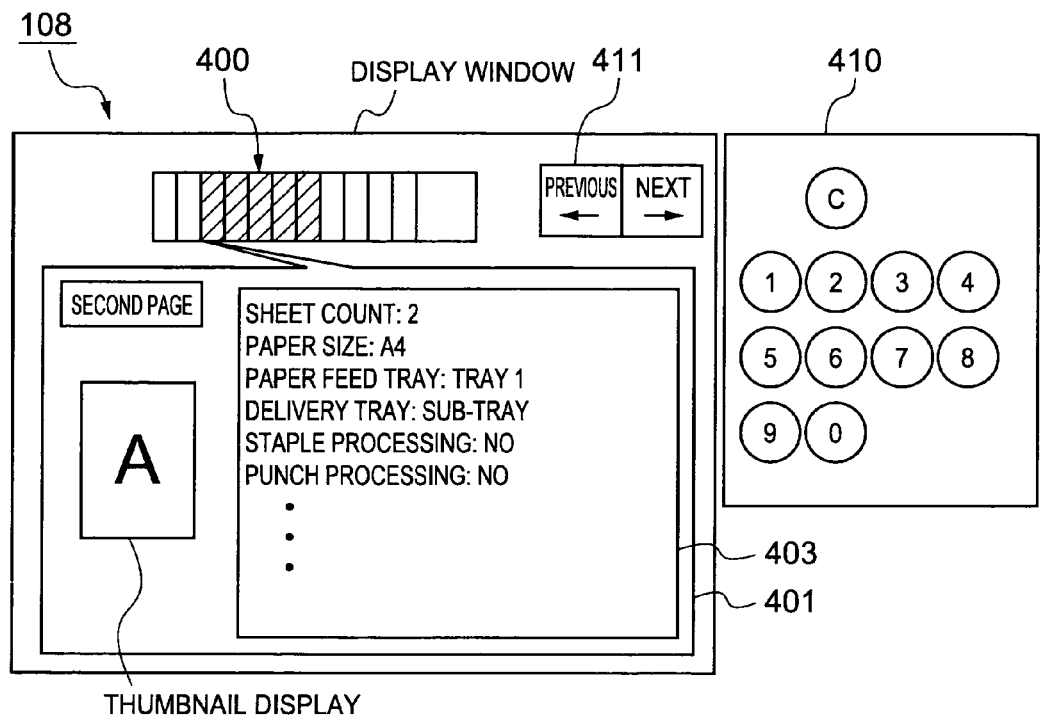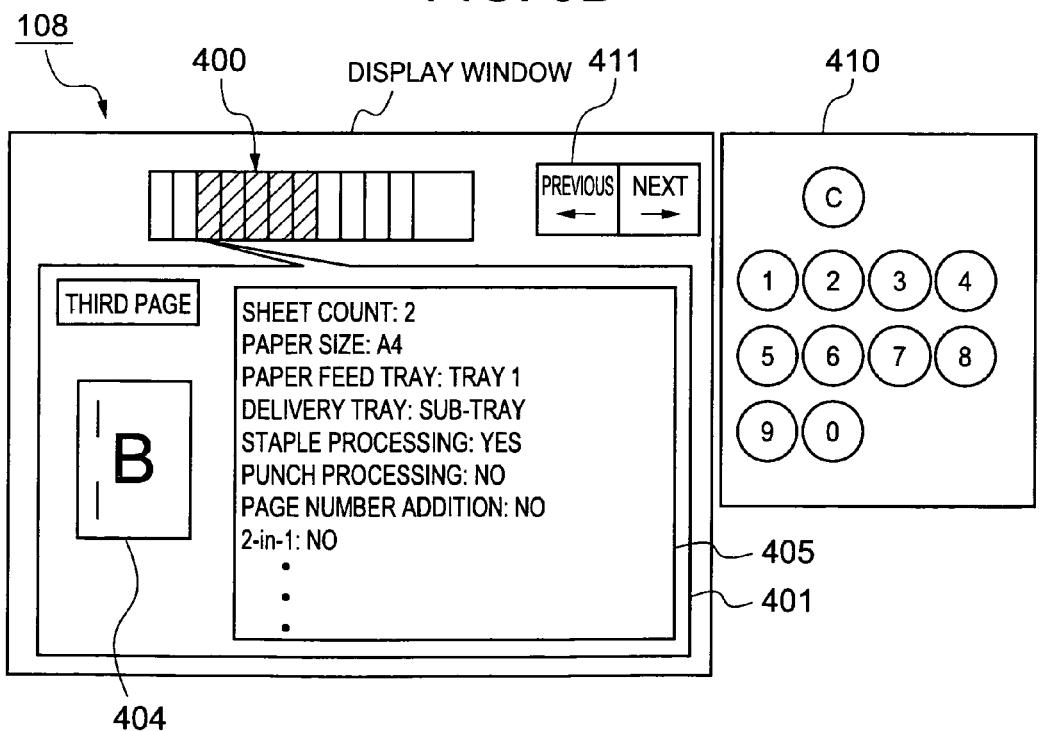

FIG. 10A

| SETTING / PAGE | CONTENTS OF POSTPROCESSING | PAPER DELIVERY POSITION | DELIMITER INFORMATION | PAGE NUMBER ADDITION | 2 IN 1 | NUMBER OF COPIES |
|---|---|---|---|---|---|---|
| 1 | STAPLING AT ONE UPPER LEFT POSITION | MAIN TRAY | NO | NO | NO | 10 |
| 2 | ← | ← | ← | ← | ← | ← |
| 3 | ← | ← | ← | ← | ← | ← |
| 4 | ← | ← | ← | ← | ← | ← |
| 5 | ← | ← | YES | ← | ← | ← |

FIG. 10B

| SETTING / PAGE | CONTENTS OF POSTPROCESSING | PAPER DELIVERY POSITION | DELIMITER INFORMATION | PAGE NUMBER ADDITION | 2 IN 1 | NUMBER OF COPIES |
|---|---|---|---|---|---|---|
| 1 | STAPLING AT ONE UPPER LEFT POSITION | MAIN TRAY | NO | YES | NO | 10 |
| 2 | ← | ← | ← | ← | ← | ← |
| 3 | ← | ← | ← | ← | ← | ← |
| 4 | ← | ← | ← | ← | ← | ← |
| 5 | ← | ← | YES → NEGLECT | ← | ← | ← |

IMAGE PRINTING APPARATUS

BACKGROUND OF THE INVENTION

1. Field of the Invention

The present invention relates to an image printing apparatus which prints image information on a recording sheet and, more particularly, to an image printing apparatus which performs postprocessing on a recording sheet after printing operation.

2. Description of the Prior Art

Recently, as print processing performed in image printing apparatuses has grown in sophistication, image printing conditions to be input have been set and managed for each recording sheet on which an image is printed, i.e., a page basis (see, for example, p. 4 and FIGS. 5 and 6 in Japanese Unexamined Patent Publication No. 2002-99179).

In such image printing apparatuses, image quality setting is performed for each page, and printing is performed with optimal image quality on a page basis, thereby realizing a high-quality printed image.

In image printing apparatuses, printed recording sheets generally undergo postprocessing, e.g., staple processing and punch processing. With increasing sophistication of image printing apparatuses, such postprocessing has become increasingly sophisticated. In addition to postprocessing, highly sophisticated processing is performed as conditions for image printing, including, for example, addition of information, e.g., page numbers, and layout processing, e.g., printing a plurality of images on one recording sheet.

According to the above prior art, however, image printing conditions like those described above cannot be set for an arbitrary set of original images at the time of reading operation.

In addition, no consideration is given to image printing conditions other than image quality. When a series of recording sheets are to be postprocessed altogether, different types of postprocessing cannot be performed on some of recording sheets. That is, the same postprocessing must be performed on a series of recording sheets.

When staple processing or punch processing is to be performed as postprocessing, in particular, it often occurs that staple processing or punch processing needs to be performed on some of a series of recording sheets. In such a case, the operator himself/herself must classify and organize image information, on which a series of recording sheets to be printed are based, for each similar postprocessing, and then must input image printing conditions on a job basis or on a multiple page basis, thereby performing printing and postprocessing on recording sheets.

Under the circumstances, therefore, it is important how to realize an image printing apparatus which can perform postprocessing setting on a series of originals at once, including different types of postprocessing.

SUMMARY OF THE INVENTION

The present invention has been made to solve the above problems in the prior art, and has as its object to provide an image printing apparatus which can efficiently set image printing conditions on a page basis and perform image printing based on the image printing conditions.

In order to achieve the above object, according to the first aspect of the present invention, there is provided an image printing apparatus comprising a setting device which sets an image printing condition in printing a copied image from an original image, an image reader which reads original image of a plurality of pages on a page basis, a read start button which causes the image reader to start reading an original image, a storage which stores original images of a plurality of pages read by the image reader, an image printing device which prints a copied image on the basis of an original image stored in the storage in accordance with an image printing condition set by the setting device, an image printing start button which instructs the image printing device to start printing a copied image, and a controller which performs control to form originals constituted by a plurality of pages into a plurality of groups in printing copied images from the originals constituted by the plurality of pages, make the setting device set image printing conditions for each group make the image reader read images on originals for each group when the read start button is pressed, make the storage store original images, and make the image printing device print copied images for each group in accordance with the image printing conditions set for each group with respect to all the groups when the image printing start button is pressed.

According to the image printing apparatus described in the first aspect, image printing conditions can be set for each arbitrary group of original images, and print processing can be managed and executed on the basis of the set image printing conditions. In performing image printing based on a series of image information, therefore, partly different image printing operation can be easily executed.

According to the second aspect of the present invention, there is provided an image printing apparatus, wherein the image printing condition described in the first aspect includes the number of sheets on which the copied images are to be printed.

According to the image printing apparatus described in the second aspect, a print count for each copied image can be easily managed.

According to the third aspect of the present invention, there is provided an image printing apparatus, wherein the image printing condition described in the first aspect includes paper delivery position information to be set when a recording sheet on which the copied image is printed is to be delivered.

According to the image printing apparatus described in the third aspect, a delivery tray can be selected for each image information.

According to the fourth aspect of the present invention, there is provided an image printing apparatus, wherein the image printing condition described in the first aspect includes delimiter information indicating the end of the same image printing condition.

According to the image printing apparatus described in the fourth aspect, when common processing is to be performed for a series of image information or recording sheets on which the image information is printed, delimiting can be performed.

According to the fifth aspect of the present invention, there is provided an image printing apparatus, wherein the controller described in the first aspect causes a postprocessing device to perform processing on a booklet basis on the basis of the delimiter information.

According to the image printing apparatus described in the fifth aspect, delimiting can be easily performed when processing is performed on a booklet basis.

According to the sixth aspect of the present invention, there is provided an image printing apparatus, wherein the delimiter information described in the fourth aspect indicates a last page in one loading operation when the original images of the plurality of pages are to be loaded by repeating loading operation.

According to the image printing apparatus described in the sixth aspect, when common processing is to be performed for a series of image information or recording sheets on which the image information is printed, delimiting can be performed.

According to the seventh aspect of the present invention, there is provided an image printing apparatus, wherein the read start button and the image printing start button described in the first aspect are the same button.

According to the image printing apparatus described in the seventh aspect, original image reading and subsequent image printing can be designated by one button, and can be continuously executed.

According to the eighth aspect of the present invention, there is provided an image printing apparatus, wherein the setting device described in the first aspect comprises a selecting device which selects whether to perform control based on the delimiter information.

According to the image printing apparatus described in the eighth aspect, since the setting device can select whether to set delimiter information, more diversified control operation can be done.

According to the ninth aspect of the present invention, there is provided an image printing apparatus, wherein the controller described in the first aspect performs the image printing without stopping a print sequence on a page basis when the image printing conditions are input on a page basis.

According to the image printing apparatus described in the ninth aspect, even when image printing conditions are input on a page basis, printing and postprocessing can be simultaneously performed on a multiple page basis.

According to the 10th aspect of the present invention, there is provided an image printing apparatus which performs image printing from one set of original images constituted by a plurality of pages in accordance with set first image printing conditions and, forms copied images constituted by a plurality of pages, comprising a setting device which sets second image printing conditions, for a predetermined page of the plurality of pages, which differ in at least one of conditions concerning a layout, information addition, and postprocessing of the first image printing conditions, and a controller which performs control to perform image printing in accordance with the second image printing conditions set by the setting device when image printing is to be performed from an original image of the predetermined page in printing the copied images constituted by the plurality of pages from the one set of original images.

According to the image printing apparatus described in the 10th aspect, image printing conditions for a specific page of a set of originals can be arbitrarily changed, and desired image printing can be performed.

According to the 11th aspect of the present invention, there is provided an image printing apparatus, wherein the layout described in the 10th aspect includes processing of outputting the plurality of original images to one page.

According to the image printing apparatus described in the 11th aspect, the processing of outputting original image of a plurality pages to one page can be performed for a specific page of a set of originals.

According to the 12th aspect of the present invention, there is provided an image printing apparatus, wherein the information addition described in the 10th aspect includes addition of page number information.

According to the image printing apparatus described in the 12th aspect, number information can be added for each page.

According to the 13th aspect of the present invention, there is provided an image printing apparatus, wherein the postprocessing described in the 10th aspect includes at least one of staple processing, punch processing, and folding processing.

According to the image printing apparatus described in the 13th aspect, at least one of postprocessing including staple processing, punch processing, and folding processing can be set for each page, and desired postprocessing can be performed for a specific page in one set of originals.

According to the 14 aspect of the present invention, there is provided an image printing apparatus, wherein the second image printing conditions described in the 10th aspect are set on a multiple page basis.

According to the image printing apparatus described in the 14th aspect, image printing conditions can be set more efficiently.

According to the 15th aspect of the present invention, there is provided an image printing apparatus, wherein the setting device described in the 10th aspect includes a display portion, displays the first image printing conditions on the display portion for each page of the original images, and sets the second image printing conditions on the basis of the display portion.

According to the image printing apparatus described in the 15th aspect, since the first image printing conditions are displayed, the second image printing conditions can be reliably set by checking the first image printing conditions.

According to the 16th aspect of the present invention, there is provided an image printing apparatus, wherein the image printing condition described in the 10th aspect includes the number of sheets to be output for the each page.

According to the image printing apparatus described in the 16th aspect, a print count can be easily managed for each image information.

According to the 17th aspect of the present invention, there is provided an image printing apparatus, wherein the display portion described in the 15th aspect displays image information of the page as a thumbnail.

According to the image printing apparatus described in the 17th aspect, whether set image printing conditions are proper can be checked by comparing an image of one page with the image printing conditions.

According to the 18th aspect of the present invention, there is provided an image printing apparatus, wherein the display portion described in the, 15th aspect comprises a bird's-eye display portion which shows a bird's-eye view of the plurality of pages.

According to the image printing apparatus described in the 18th aspect, since a bird's-eye view of a plurality of pages is shown, the operator can easily recognize the differences between image printing conditions throughout a plurality of pages.

According to the 19th aspect of the present invention, there is provided an image printing apparatus, wherein the bird's-eye display portion described in the 18th aspect comprises different display forms for pages having different image printing conditions.

According to the image printing apparatus described in the 19th aspect, the differences image printing condition among a plurality of pages can be easily recognized.

According to the 20th aspect of the present invention, there is provided an image printing apparatus, wherein the display form described in the 19th aspect is a display color representing the page.

According to the image printing apparatus described in the 20th aspect, the operator can recognize the differences in image printing condition among a plurality of pages at a glance.

According to the 21st aspect of the present invention, there is provided an image printing apparatus, wherein the display portion described in the 15th aspect comprises a ten-key pad which designates a number assigned to a page to be displayed and a shift key which sequentially designates a previous page or a next page of a displayed page.

According to the image printing apparatus described in the 21st aspect, a page to be displayed can be freely selected.

According to the 22nd aspect of the present invention, there is provided an image printing apparatus comprising a storage which stores one set of original image data constituted by a plurality of pages, a setting device which sets an image printing condition in forming a copied image, and an image printing device which prints a copied image by reading out original image data stored in the storage, performing image printing in accordance with the image printing condition set by the setting device, and performing paper delivery, wherein in setting image printing conditions, the setting device can set at least one of conditions concerning a layout, information addition, and postprocessing on a page basis when printing copied image constituted by a plurality of pages from one set of original images constituted by a plurality of pages.

According to the image printing apparatus described in the 22nd aspect, when copied image are to be obtained from one set of original image data, at least one of image printing conditions concerning a layout, information addition, and postprocessing can be freely set for an arbitrary page.

According to the 23rd aspect of the present invention, there is provided an image printing apparatus, wherein the image printing conditions described in the 22nd aspect can be set on a multiple page basis.

According to the image printing apparatus described in the 23rd aspect, image printing conditions can be set on a multiple page basis, and hence can be efficiently set.

According to the 24th aspect of the present invention, there is provided an image printing apparatus, wherein the setting device described in the 22nd aspect includes a display portion, displays the image printing conditions on the display portion for each page of the original images, and sets the second image printing conditions on the basis of the display portion.

According to the image printing apparatus described in the 24th aspect, image printing conditions can be reliably set while being checked.

According to the 25th aspect of the present invention, there is provided an image printing apparatus, wherein the image printing condition described in the 22nd aspect includes the number of sheets to be output for the each page.

According to the image printing apparatus described in the 25th aspect, a print count can be easily managed for each image information.

According to the 26th aspect of the present invention, there is provided an image printing apparatus, wherein the display portion described in the 24th aspect displays image information of the page as a thumbnail.

According to the image printing apparatus described in the 26th aspect, whether set image printing conditions are proper can be checked by comparing an image of one page with the image printing conditions.

According to the 27th aspect of the present invention, there is provided an image printing apparatus, wherein the display portion described in the 24th aspect comprises a bird's-eye display portion which shows a bird's-eye view of the plurality of pages.

According to the image printing apparatus described in the 27th aspect, since a bird's-eye view of a plurality of pages is shown, the operator can easily recognize the differences between image printing conditions throughout a plurality of pages.

According to the 28th aspect of the present invention, there is provided an image-printing apparatus, wherein the bird's-eye display portion described in the 27th aspect comprises different display forms for pages having different image printing conditions.

According to the image printing apparatus described in the 28th aspect, the differences image printing condition among a plurality of pages can be easily recognized.

According to the 29th aspect of the present invention, there is provided an image printing apparatus, wherein the display form described in the 28th aspect is a display color representing the page.

According to the image printing apparatus described in the 29th aspect, the operator can recognize the differences in image printing condition among a plurality of pages at a glance.

According to the 30th aspect of the present invention, there is provided an image printing apparatus, wherein the display portion described in the 24th aspect comprises a ten-key pad which designates a number assigned to a page to be displayed and a shift key which sequentially designates a previous page or a next page of a displayed page.

According to the image printing apparatus described in the 30th aspect, a page to be displayed can be freely selected.

The above and many objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 7A to 7C are views each showing an example of individual image printing conditions input on a multiple page basis in the first embodiment concerning checking and setting of image printing conditions in the image printing apparatus of the present invention;

FIGS. 8A and 8B are views each showing an example of individual image printing conditions input on a job basis in the first embodiment concerning checking and setting of image printing conditions in the image printing apparatus of the present invention;

FIGS. 9A and 9B are views each showing the second embodiment of a display window associated with checking and setting of image printing conditions in the image printing apparatus of the present invention;

FIGS. 10A and 10B are views each showing an example of individual image printing conditions input on a job basis in the second embodiment concerning checking and setting of image printing conditions in the image printing apparatus of the present invention.

DETAILED DESCRIPTION OF THE PREFERRED EMBODIMENTS

Several preferred embodiments of the image printing apparatus of the present invention will be described below with reference to the accompanying drawings. Note that the present invention is not limited to these embodiments.

The overall arrangement of the image printing apparatus according to the present invention will be described first.

Figure 1:
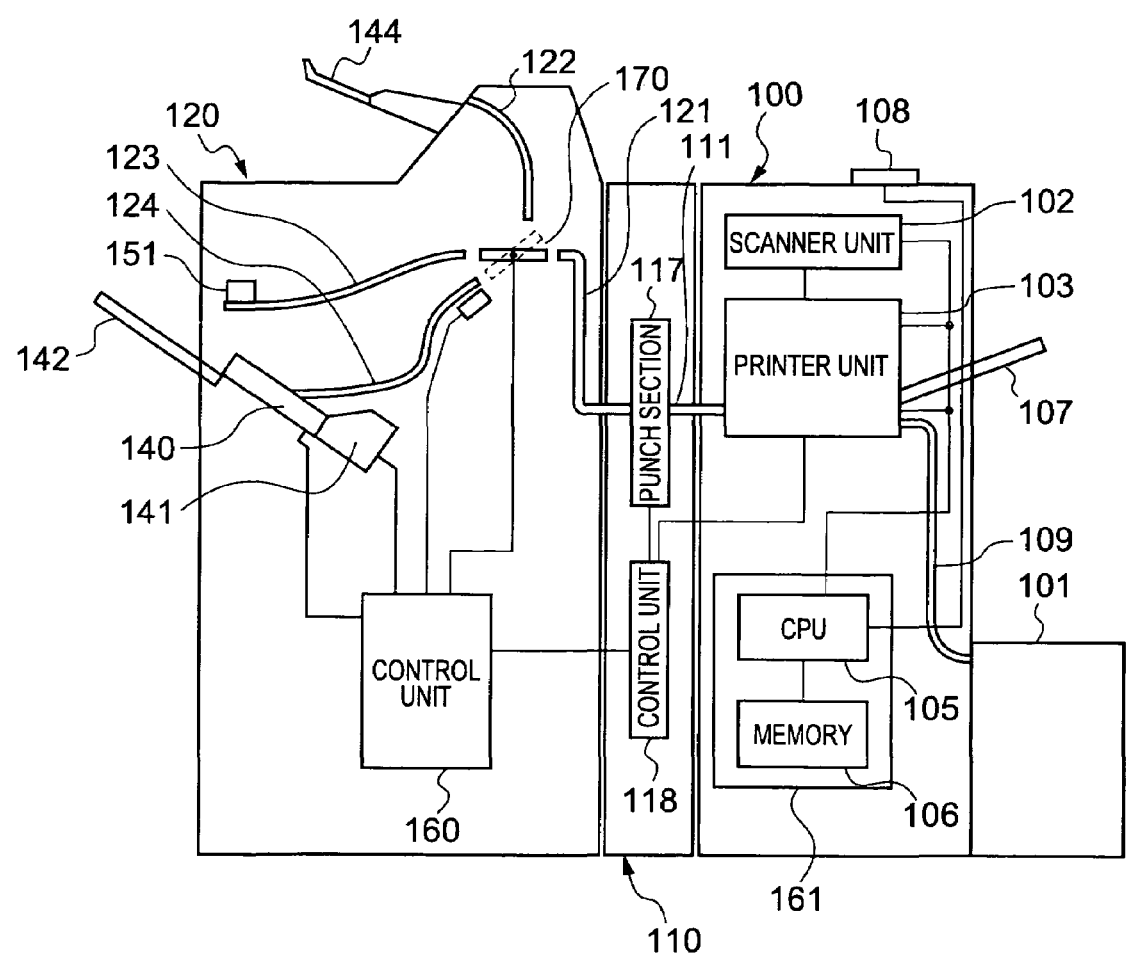
FIG. 1 is a view for explaining the overall schematic arrangement of a digital multifunction apparatus as an embodiment of the image printing apparatus of the present invention.

FIG. 1 is a view showing the overall arrangement of the image printing apparatus. This image printing apparatus includes a digital multifunction apparatus 100, punch unit 110, and postprocessing device 120. The digital multifunction apparatus 100 is constituted by a main body and a paper feed tray 101. The main body includes a scanner unit 102 which is an example of an image reader, a printer unit 103 which is part of an image printing unit, a paper feed tray 107, convey paths 109 and 111, a CPU 105 forming a controller 161, an image memory 106, and the like. The punch unit 110 designed to perform punch processing includes a punch section 117 and a punch controller 118 which controls the punch section 117. The postprocessing device 120 includes convey paths 121 to 124, a gate 170, a shift unit 151, a stack unit 140, a staple unit 141, a main tray 142 and sub-tray 144 which serve as delivery trays, and a controller 160. The punch unit 110 and postprocessing device 120 constitute an image printing unit, together with the printer unit 103 described above and the like.

An operation unit 108 has a setting device which is used to set image printing conditions and includes a touch panel such as an LCD (Liquid Crystal Display) and a ten-key pad.

Although not shown, the operation unit 108 has a read start button which instructs the scanner unit 102 to start reading an original, an image printing start button for instructing the start of image printing, and a setting device for setting image printing conditions.

Image printing conditions in the present invention are output conditions in printing a copied image from an original image, which include, for example, conditions concerning postprocessing, information addition, a layout, double-sided/single-sided copying, and delivery destination tray selection. More specifically, postprocessing includes stapling, punching, delivery destination tray selection, and the like, the information addition condition includes addition of a page number to each original page and the like, and a layout includes the layout of 1-page information to be output. The layout processing includes, for example, the processing of outputting a plurality of pages of original images to one sheet, i.e., a so-called N-in-1 process.

The scanner unit 102 reads images on originals stacked on the scanner unit 102 on a page basis. The printer unit 103 receives a recording sheet supplied through the convey path 109 of the paper feed tray 101 or from the paper feed tray 107 and transfers an image read by the scanner unit 102 onto the recording sheet, thus performing image printing. The recording sheet on which the image is printed by the printer unit 103 is fed from the printer unit 103 to the punch unit 110 through the convey path 111.

The punch unit 110 forms punch holes in a recording sheet from the digital multifunction apparatus 100 by using the punch section 117 on the basis of control information. The postprocessing device 120 then takes in the recording sheet delivered from the punch unit 110 onto the convey path 121 and selects one of the convey paths 122 to 124 through the gate 170 depending on whether the sheet is delivered to the main tray 142 or sub-tray 144, or whether shift processing is performed by the shift unit 151 or staple processing is performed by the staple unit 141 in the postprocessing step when the sheet is to be delivered onto the main tray 142.

In performing staple processing in the postprocessing step, the stack unit 140 of the postprocessing device stores a plurality of recording sheets. The staple unit 141 of the postprocessing device binds the recording sheets stored in the stack unit 140 by driving staples into them in accordance with an instruction from the controller 160.

Note that the recording sheets conveyed from the convey path 124 onto the stack unit 140 slide down to a side stitching stopper by their own weights. With this operation, the recording sheets in the stack unit 140 are registered in the convey direction and set in the registered state in the convey direction. Recording sheets are registered in a direction perpendicular to the convey direction by being tapped by a tapping mechanism located perpendicular to the drawing surface of FIG. 1 in accordance with an instruction from the controller 160. A plurality of recording sheets which are stapled are pushed upward by a paper delivery belt in the stack unit 140 while the trailing ends of the sheets are held by a delivery pawl, and are delivered onto the main tray 142.

On the shift unit 151, a recording sheet, which is transferred from the convey path 121 into the convey path 123 through the gate 170, is delivered onto the main tray 142 after shifting its direction so as to be perpendicular to the recording sheet convey direction. This makes it possible to sort, on the main tray 142, recording sheets on which different contents are copied.

The sub-tray 144 serves as a tray for recording sheets transferred to the display 122 and delivered. The sub-tray 144 is located on the upper stage of the postprocessing device 120, and allows delivered recording sheets to be easily taken out from the upper portion of the postprocessing device 120.

Figure 2:
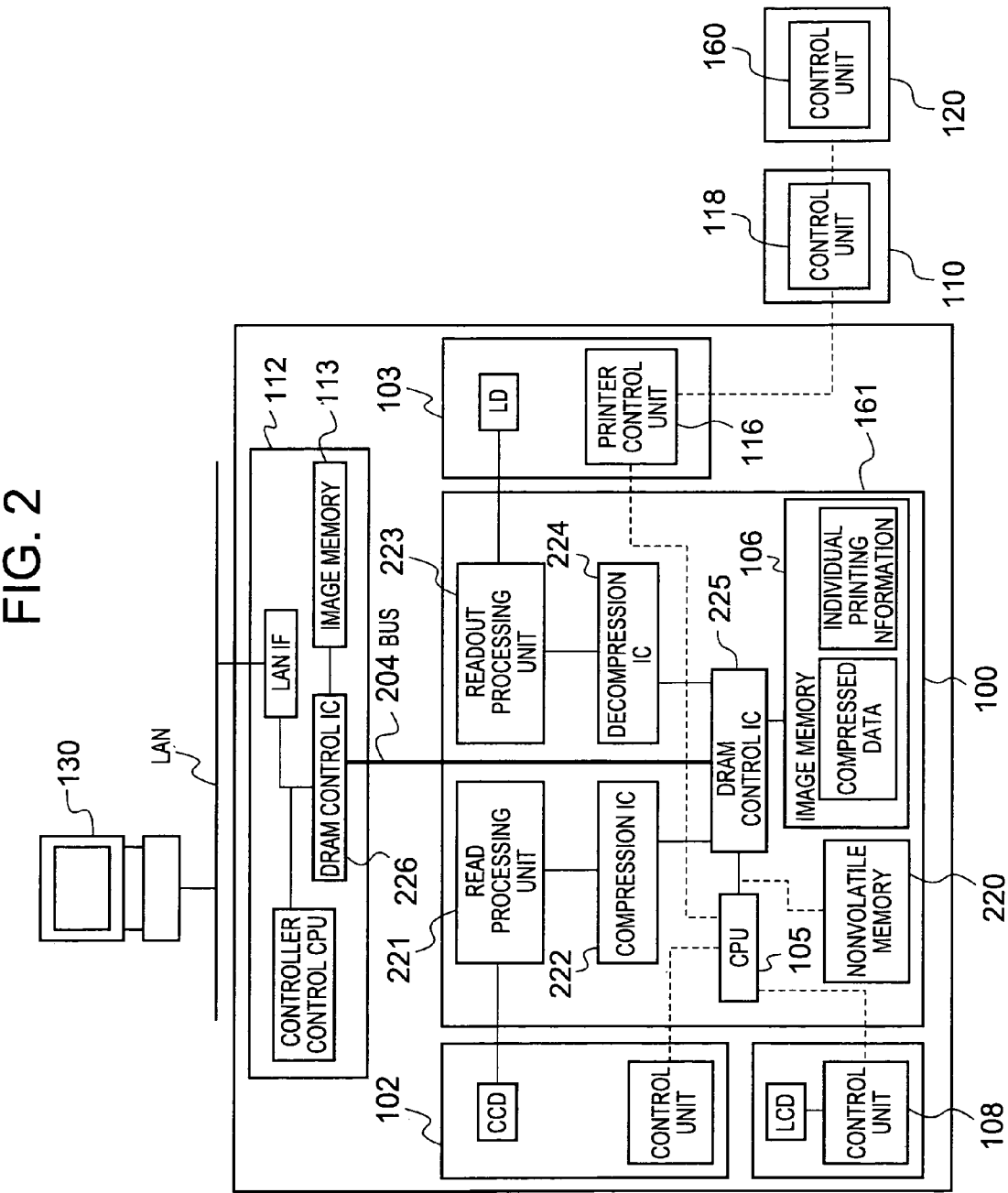
FIG. 2 is a system block diagram showing the schematic arrangement of the main part of the digital multifunction apparatus in FIG. 1, which is mainly formed from a controller.

FIG. 2 is a system block diagram showing the flow of image information and control information mainly in the controller 161 of the digital multifunction apparatus 100. When image information is to be loaded from the scanner unit 102, the CCD (Charge Coupled Device) of the scanner unit 102 reads image information on an original, and a read processing unit 221 of the controller 161 loads the information. The image information is then compressed by a compression IC 222 and stored in the image memory 106. Image printing conditions for each image information can be input from the operation unit 108 having the setting device on a job basis, on a multiple page basis, or on a page basis. The input conditions are also stored in the image memory 106.

When image information is to be loaded from a terminal 130 through a LAN (Local Area Network), the image information is loaded into an image memory 113 of an image processing unit 112. The information is then loaded into the image memory 106 of the controller 161 through a bus 240. The image information in the image memory 106 is transferred to the compression IC 222 through a DRAM control IC 225 to be compressed. Thereafter, the compressed information is stored in the image memory 106 again.

Note that the image memories 106 and 113 are formed by using DRAMs (Dynamic Random Access Memories), and are respectively controlled by the DRAM control IC 225 and a DRAM control IC 226 which refresh stored information.

The compressed data of the image information stored in the image memory 106 is transferred to a decompression IC 224 through the DRAM control IC 225, in which the image information is decompressed. Subsequently, the information is transmitted from a readout processing unit 223 to the LD (Laser Diode) of the printer unit 103 to print an image. The information of the image printing condition in the image memory 106 is transferred to the printer controller 116 of the printer unit 103 through the CPU 105. On the basis of this control information, the printer controller 116 controls the printer unit 103, and also controls the succeeding punch unit 110 and postprocessing device 120.

Several embodiments concerning checking and setting of image printing conditions in the present invention will be described below.

1. First Embodiment Concerning Checking and Setting of Image Printing Conditions In the first embodiment, when copied images are to be printed on the basis of originals constituted by a plurality of pages, the originals constituted by the plurality of pages are formed into groups, and image printing conditions are set for each group by the setting device. When the read start button is pressed, original images are read by a scanner unit 102 serving as an image reader for each group. The read original images are then stored in an image memory 106 serving as a storage unit. When the image printing start button is pressed, copied images based on the image printing conditions set on a group basis are printed by a printer unit 103 serving as an image printing unit on a group basis throughout all the groups.

Figure 3:
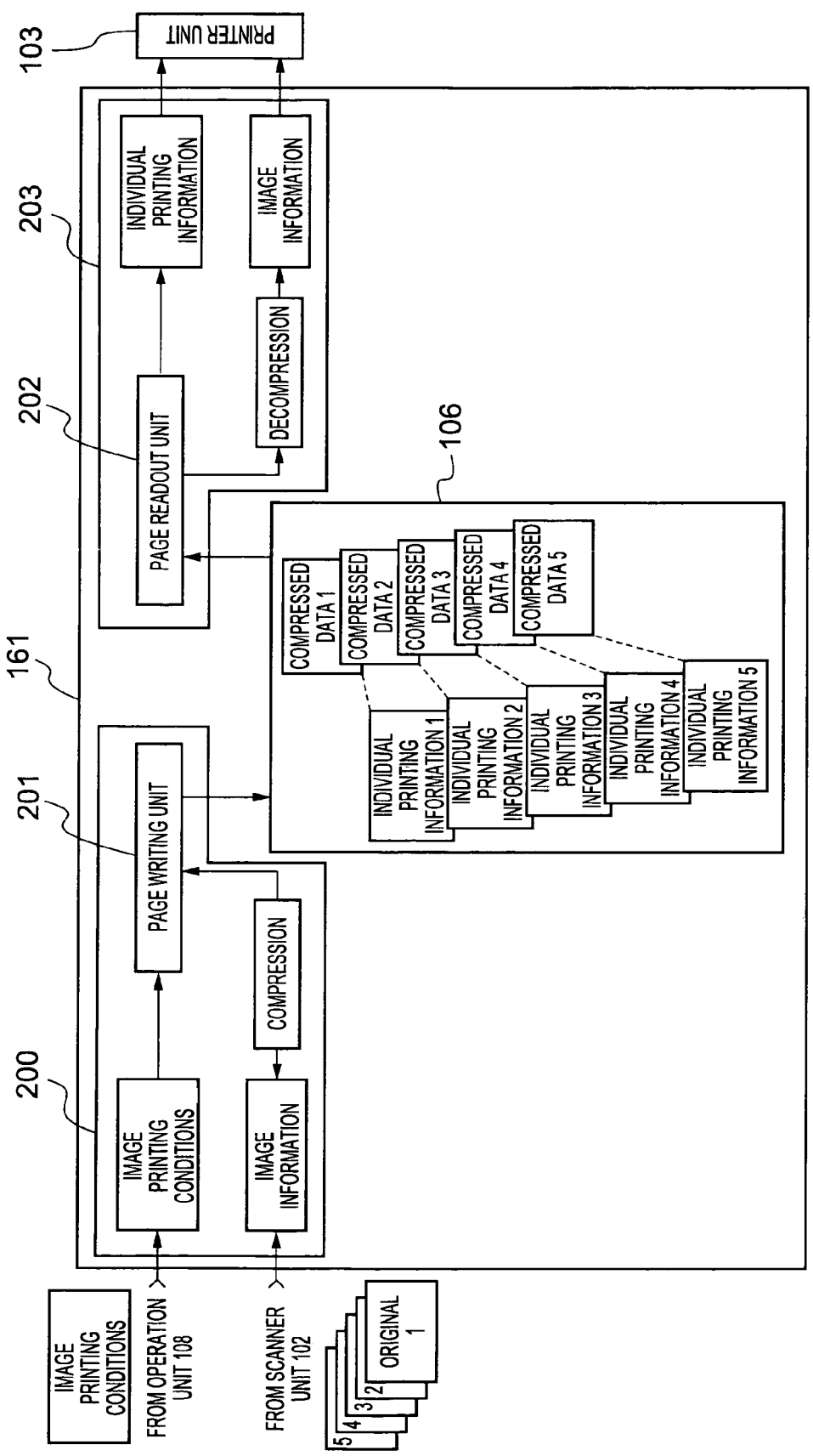
FIG. 3 is a function block diagram of the controller in the digital multifunction apparatus in FIG. 1.

FIG. 3 is a functional block diagram showing how image information and image printing conditions are written and read to and from the image memory 106. Note that hardware which forms an image reader 200 and readout unit 203 includes a CPU 105, nonvolatile memory 220, DRAM control IC 225, read processing unit 221, compression IC 222, decompression IC 224, and readout processing unit 223.

An operation unit 108 is operated by the operator to set image printing conditions when a series of image information, originals 1 to 5 in the case shown in FIG. 3, are to be loaded. The image printing conditions are set on a job basis, on a multiple page basis, on a group basis, or on a page basis. The controller 161 loads the image printing conditions and the image information of originals 1 to 5 into the image memory 106 by using the image reader 200. The image information of originals 1 to 5 is compressed by the compression IC 222. A page writing unit 201 then creates individual image printing conditions for each page of the compressed image information from the image printing conditions input on a job basis, on a multiple page basis, or on a page basis. The individual image printing conditions and the compressed data of pages are stored in the image memory 106 while the conditions are associated with the compressed data of the corresponding pages by linking them to each other. The page writing unit 201 repeats this operation and stores a series of image information in the image memory 106. Referring to FIG. 3, image printing conditions and image information are loaded from the operation unit 108 and scanner unit 102. However, when image printing conditions and image information are to be input from a terminal 130, they are loaded from the terminal 130 through a LAN (Local Area Network), as shown in FIG. 2. The image information and image printing conditions are loaded into an image memory 113 of an image processing unit 112, and are then loaded into the image memory 106 of the controller 161 through a bus 204. Note that the image printing conditions to be loaded into the image processing unit 112 are input on a job basis, on a multiple page basis, or on a page basis.

The individual image printing conditions and compressed data stored in the image memory 106 are read out by the readout unit 203. A page readout unit 202 of the readout unit 203 sequentially reads out compressed data and an individual image printing condition associated with the compressed data in pairs. The compressed data is decompressed by the decompression IC 224. The decompressed data is then transmitted as image information to the printer unit 103, together with the corresponding individual image printing condition.

Figure 4:
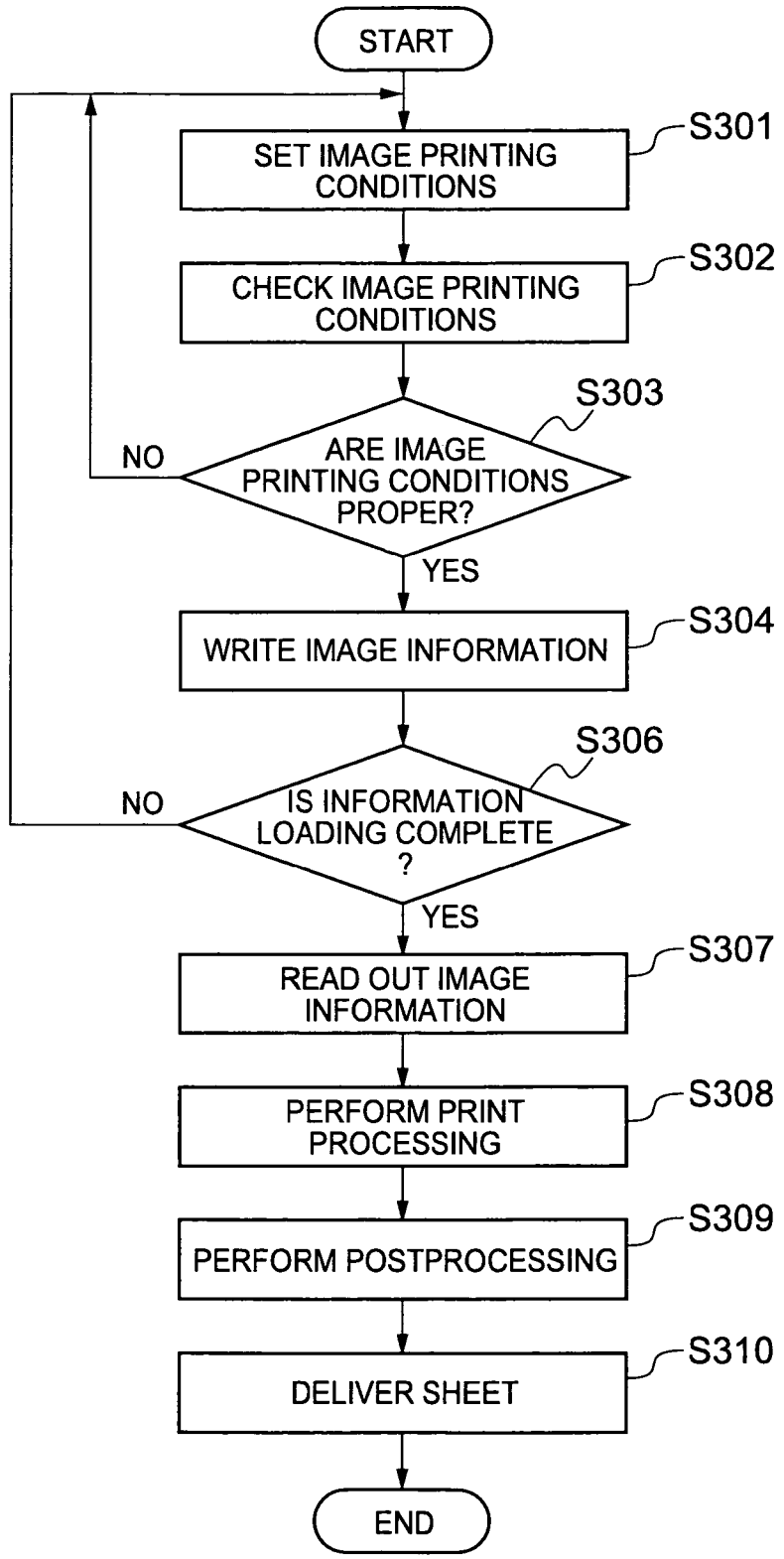
FIG. 4 is a flow chart showing the operation of the controller in the image printing apparatus of the present invention.

The operation of a digital multifunction apparatus 100 according to the present invention will be described next with reference to FIG. 4. First of all, the operator operates the operation unit 108 having the setting device to select an input method for image printing conditions, i.e., inputting on a job basis, on a multiple page basis, or on a page basis, and to set image printing conditions for originals afterward (step S301). In this setting operation, the operator operates the touch panel or ten-key pad of the operation unit 108 to simultaneously set, in addition to printer information, e.g., an original size, a print count, and density, postprocessing information for punch processing or staple processing as an image printing condition. Note that in this setting operation, postprocessing for each group and for each page can also be set, set image printing conditions may include complex, various kinds of conditions.

Figure 5A:
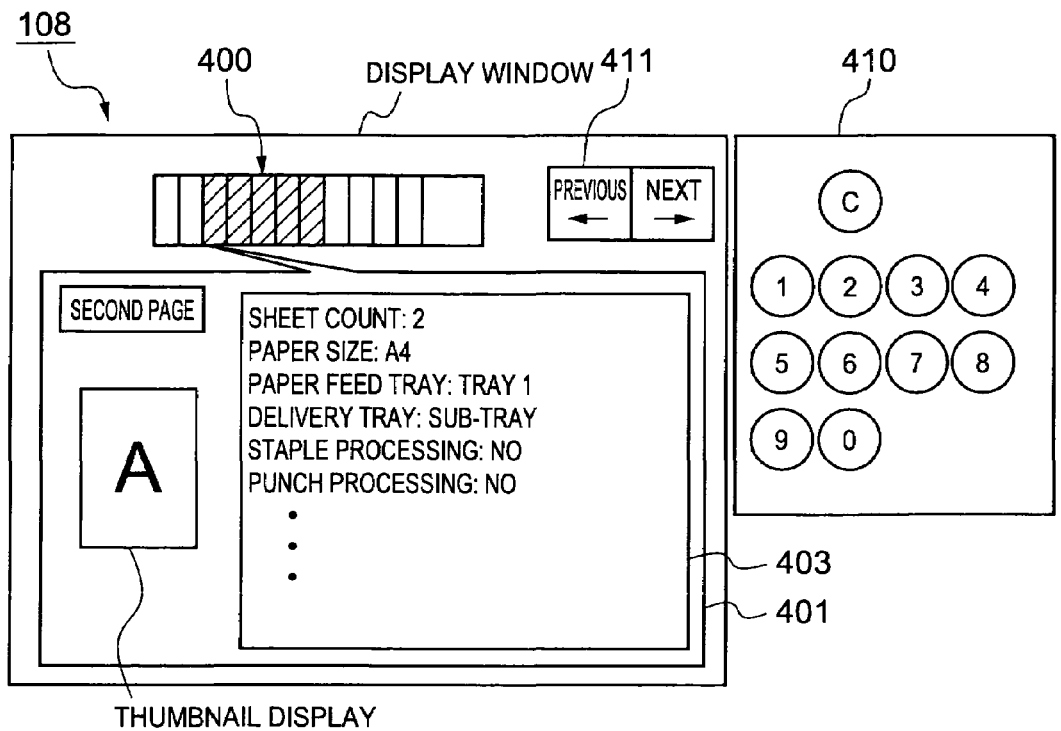
FIGS. 5A and 5B are views each showing the first embodiment of a display window associated with checking and setting of image printing conditions in the image printing apparatus of the present invention.
Figure 5B:
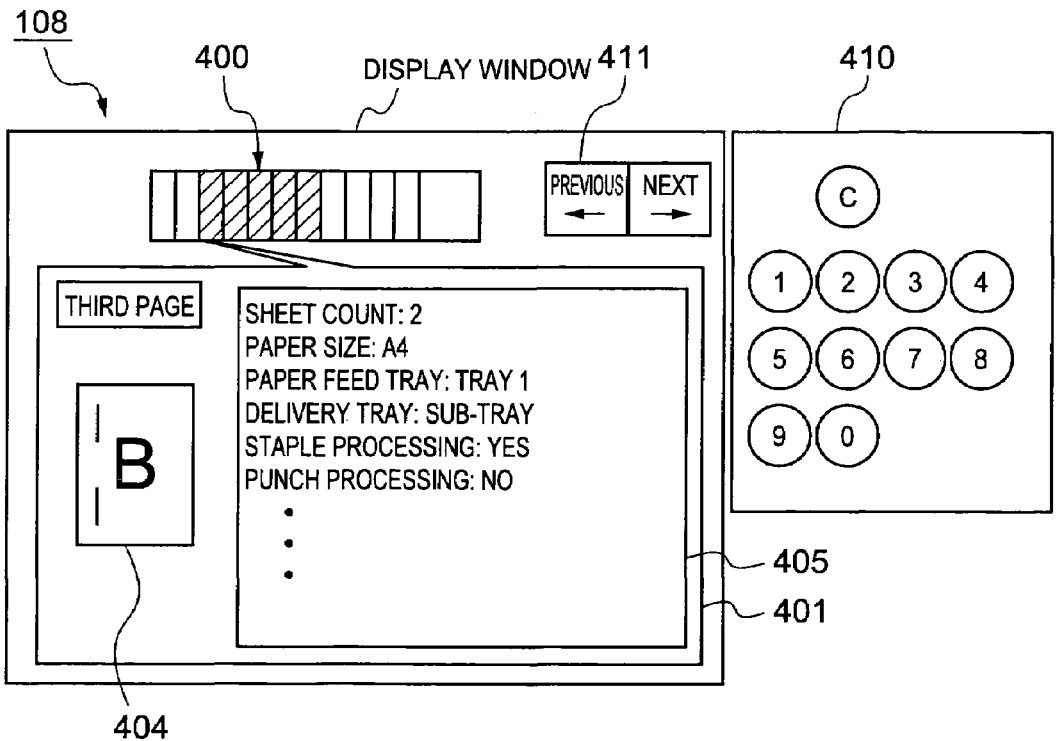

Subsequently, the operator checks the input image printing conditions (step S302). This check is required to perform output operation without mistake when the image printing conditions include complex, various kinds of conditions. FIGS. 5A and 5B show an example of a display changing unit for this check.

The display window and a ten-key pad 410 shown FIGS. 5A and 5B constitute a setting device which checks and changes image printing conditions on a page basis. This display window includes a bird's-eye display portion 400 which shows a bird's-eye view of a plurality of originals for each input image printing condition, an individual display portion 401 which displays image printing conditions on an original page basis, and a shift key 411. In the bird's-eye display portion 400, image displays (layouts) each representing one original, equal in number to all the originals for which settings are to be made, are arranged in a line in the horizontal direction in an overlapped state with positional offsets. In this case, one original is displayed in the form of a rectangle. In the individual display portion 401, image printing conditions are listed for each original page corresponding to the layout selected in the bird's-eye display portion 400. Note that a layout representing one original is selected by page designation with the ten-key pad 410 or shift operation with the shift key 411 on the upper right portion in the display window. Note that layouts each representing one original in the bird's-eye display portion 400 are displayed in different manners in accordance with different image printing conditions, e.g., displayed in different colors or by shading.

The display window serving as this setting device can also be used to check and change image printing conditions after image information is loaded from the scanner unit 102. In this case, a reduced image of an output original is displayed as a thumbnail on the left side of the individual display portion 401 to allow the operator to easily check the output original.

FIG. 5A shows an example in which when 12 originals are read and are to be printed, individual display of the second page is performed. In this example, since the third to seventh pages are subjected to staple processing, the corresponding pages are displayed by shading. FIG. 5B shows an example similar to that shown in FIG. 5A, in which when 12 originals are read and are to be printed, individual display of the third page is performed. In this example, since the third to seventh pages are subjected to staple processing, a graphic pattern schematically representing staple processing is added to an image subjected to thumbnail display 404.

Referring back to FIG. 4, the operator determines, by using the setting device shown in FIGS. 5A and 5B, whether the image printing conditions are proper (step S303). If the image printing conditions are not proper (NO in step S303), the flow returns to step S301 to set image printing conditions again. Note that changes accompanying this re-setting operation can be made by using the display window shown in FIGS. 5A and 5B. Assume that the image printing condition portion shown which is included in the individual display portion 401 and in which the image printing conditions are displayed on a page basis is a touch panel. In this case, if, for example, the operator touches the staple processing portion, the current window shifts to a staple processing setting window to allow the operator to easily set/change staple processing.

If the image printing conditions are proper (YES in step S303), the operator places an original on the scanner unit 102 to read image information and write it in the image memory 106 (step S304). In this writing operation, the page writing unit 201 shown in FIG. 3 is used to store the image printing conditions input on a job basis, on a multiple page basis, or on a page basis in the image memory 106 upon setting the image printing conditions as individual image printing conditions for each image information and liking them to the compressed data of the image information.

The CPU 105 then checks whether a predetermined load count is complete (step S306). If the load count is not complete (NO in step S306), the flow returns to step S301 to set image printing conditions.

If the load count is complete (YES in step S306), the CPU 105 reads out image information by reading out compressed data and individual image printing conditions from the image memory 106 (step S307). In reading out this image information, compressed data and individual image printing conditions liked to the compressed data are sequentially read out by using the page readout unit 202 shown in FIG. 3. This compressed data is transmitted as image information to the printer unit 103, together with the individual image printing condition, after decompression.

Subsequently, a printer controller 116 of the printer unit 103 performs print processing of the image information on the basis of the individual image printing conditions (step S308). In addition, since the individual image printing conditions include postprocessing information, a punch unit 110 and postprocessing device 120 perform postprocessing on the basis of postprocessing information from the printer controller 116 (step S309). The resultant recording sheet is then delivered onto the delivery tray (step S310).

The following are examples of the individual image printing conditions transmitted from the image memory 106 to the printer unit 103, postprocessing performed by the punch unit 110 and postprocessing device 120 in step S309, and delivery of sheets to a main tray 142 or sub-tray 144.

Figures 6A, 6B:
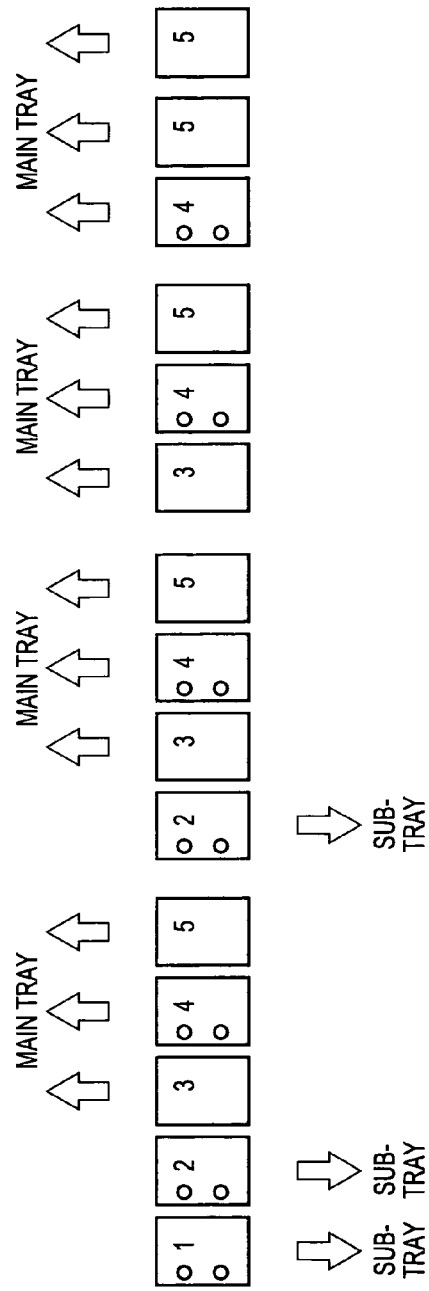
FIGS. 6A and 6B are views each showing an example of individual image printing conditions input on a page basis in the first embodiment concerning checking and setting of image printing conditions in the image printing apparatus of the present invention.

FIG. 6A shows a table of an example of individual image printing conditions which are input on a page basis. Note that each field in which an upward arrow is written indicates that the written image printing condition is the same as that written in the immediately above field. These individual image printing conditions correspond to those shown in FIG. 3, and are associated with the individual image printing conditions linked to pages 1 to 5 of the originals for which image printing conditions are set. The longitudinal axis of the table represents page numbers, and the transverse axis represents items of image printing conditions. In this case, a postprocessing item, selection of a delivery tray, the number of copies, and delimiter information indicating delimiting of processing are displayed as individual image printing conditions for each page. For example, this delimiter information is used when booklet-basis processing is to be performed. FIG. 6B exemplifies the recording sheets to be output when paper delivery is performed on the basis of the individual image printing conditions shown in FIG. 6A. Referring to FIG. 6B, recording sheets equal to the number of copies corresponding to the respective page numbers in FIG. 6A are output to the designated main tray 142 and sub-tray 144, and the designated pages are punched by the punch unit 110.

FIG. 7A shows a table of an example of individual image printing conditions which are input on a multiple page basis. In the case shown in FIG. 3, these individual image printing conditions are set such that the image printing conditions set for original pages 1 to 3 are made to differ from those set for pages 4 and 5, and image information is loaded for each bundle of originals, i.e., for each of a bundle of pages 1 to 3 and a bundle of pages 4 and 5. In this case, designation of execution or nonexecution of punching and selection of different delivery trays are made for pages 1 to 3 and pages 4 and 5. Note that the delimiter information added to page 3 is neglected because no booklet-basis postprocessing is included.

FIG. 7B shows a table of an example of individual image printing conditions input on a multiple page basis. Similar to FIG. 7A, FIG. 7B shows a case wherein different image printing conditions are set for original pages 1 to 3 and pages 4 and 5, and image information is loaded for each bundle of originals, i.e., each of a bundle of pages 1 to 3 and a bundle of pages 4 and 5. In this case, each of a bundle of pages 1 to 3 and a bundle of pages 4 and 5 is subjected to staple processing at an upper left position. In this case, delimiter information is used to delimit staple processing which is booklet-basis processing.

FIG. 7C shows a table of an example of individual image printing conditions input on a multiple page basis. Similar to FIG. 7A, FIG. 7C shows a case wherein different image printing conditions are set for original pages 1 to 3 and pages 4 and 5, and image information is loaded for each bundle of originals, i.e., each of a bundle of pages 1 to 3 and a bundle of pages 4 and 5. In this case, when the operator does not want to use a given image printing condition for image output operation after the condition is set, the use of the condition can be easily inhibited. For example, delimiter information is set valid or invalid (used or not used) in accordance with set information in the operation unit 108 or nonvolatile memory 220. In this case, similar to the case shown in FIG. 7B, delimiter information is neglected, i.e., is not used, on the basis of the above set information. As a result, pages 1 to 5 are output as a booklet having undergone staple processing at an upper left position. With this arrangement, when, for example, the operator does not temporarily want to use a set image printing condition, efficient operation can be done without requiring to change the image printing condition itself.

FIG. 8A shows a table of an example of individual image printing conditions input on a job basis. Similar to the case shown in FIG. 3, in this case, the individual image printing conditions are set for original pages 1 to 5 on a job basis, and image information is loaded. In this case, staple processing is executed in accordance with the delimiter information set for the last page, and staple processing is performed at an upper left position on a bundle of pages 1 to 5, thereby outputting the resultant pages as a booklet.

Similar to FIG. 8A, FIG. 8B shows an example of how the delimiter information for the last page is neglected. As in the case shown in FIG. 8A, staple processing is performed on a bundle of pages 1 to 5 at an upper left position, and the resultant pages are output as a booklet. In this case, however, delimiter information is neglected, and staple processing is executed as final processing on pages 1 to 5.

As described above, according to the first embodiment concerning checking and setting of image printing conditions in the present invention, image printing conditions include postprocessing information executed by the punch unit 110 and postprocessing device 120 and selection information for the main tray 142 or sub-tray 144. When image printing conditions are to be written in the image memory 106 by using the page writing unit 201, the image printing conditions are stored in the image memory 106 after being set as individual image printing conditions for each image information and linked to image information. When image printing conditions are to be read out by the page readout unit 202, the individual image printing conditions are read out, together with image information, and postprocessing is executed for each image processing, i.e., each original. This makes it possible to simultaneously make postprocessing settings including different kinds of postprocessing for a series of originals, and execute the postprocessing.

In addition, according to the first embodiment, set image printing conditions are selected and displayed on a page basis from the bird's-eye display portion 400 by using a display window serving as a setting device, and image information is displayed as a thumbnail, thereby allowing the operator to reliably check and change image printing conditions on a page basis without any confusion.

2. Second Embodiment of Checking and Setting of Image Printing Conditions

The second embodiment concerning checking and setting of image printing condition according to the present invention will be described below.

In the second embodiment, image printing is performed from a set of original images constituted by a plurality of pages in accordance with the first image printing conditions that have been set, thereby printing copied images constituted by a plurality of pages. Assume that at least one of conditions concerning a layout, addition of information, and postprocessing of the first image printing conditions is set in the second image printing conditions which are different from the first image printing conditions with respect a predetermined page of a plurality of pages, and copied images constituted by a plurality of pages are printed from a set of original images. In this case, when image printing is to be performed from the original image on a predetermined page, image printing is performed in accordance with the second image printing conditions set by the setting device. This processing will be described in detail below.

The basic arrangement of the image printing apparatus which executes checking and setting of image printing conditions according to the second embodiment is the same as that of the first embodiment shown in FIG. 2.

A set of original image data constituted by a plurality of pages is input from a scanner unit 102, terminal 130, or the like to a controller 161. In this case, the first image printing conditions are set for the original image data. Specific examples of the first image printing conditions include conditions concerning staple processing and punch processing as postprocessing, addition of a page number as information addition, the processing of outputting a plurality of pages of original images to one sheet as a layout, double-side/single-sided copying, selection of a delivery destination tray.

The original image data to which the first image printing conditions are added is stored in a memory 106. Note that the first image printing conditions may be set in advance by using the values of conditions generally used as initial values. For example, nonexecution of staple processing and punch processing and the main tray as a delivery destination tray are set.

In the second embodiment, with regard to such original image data, conditions concerning postprocessing, information addition, and layout of the first image printing conditions set for a predetermined page can be changed to set the second image printing conditions different from the first image printing conditions.

An example of the sequence for changing settings of image printing conditions will be described below. First of all, with regard to a set of original image data constituted by a plurality of pages, the first image printing conditions are displayed in a display window on an operation unit 108.

Each of FIGS. 9A and 9B shows an example of a display window for image printing conditions on the operation unit 108 according to the second embodiment. Note that portions denoted by the same reference numerals as in FIGS. 9A and 9B have the same functions in FIGS. 5A and 5B. In this display window, at least image printing conditions concerning postprocessing, addition of a page number as an example of addition information, a 2-in-1 mode (printing two originals on one recording sheet) as an example of a layout are displayed for a check. Although image printing conditions for all the pages of one set may be displayed, an arrangement may be to select a page which the operator wants to change and display only image printing conditions corresponding to the selected page.

The operator changes the image printing conditions on the basis of this display. That is, the operator sets the second image printing conditions from the first image printing conditions. FIGS. 10A and 10B show a change example. FIG. 10A shows the first printing conditions before the change. FIG. 10B shows the second image printing conditions after the change. The image printing unit performs image printing on the basis of the second image printing conditions. In the example shown in FIG. 10B, the 2-in-1 mode as an example of a layout is not set, and addition of a page number as an example of information addition is set. That is, the second image printing conditions are equivalent to the image printing conditions described with reference to FIG. 8A to which a page number addition function is added. Therefore, image printing is performed basically in the same manner as in FIGS. 8A and 8B except for addition of a page number.

In the second embodiment, image printing conditions other than conditions concerning postprocessing, addition information, and a layout can be changed, and hence the degree of freedom in output operation is increased.

As described above, in the second embodiment, image printing conditions include conditions concerning postprocessing to be performed by a punch unit 110 and postprocessing device 120, a layout set by an image processing unit 112, information addition, selection of a main tray or sub-tray as a delivery destination tray, and the like. A page readout unit 202 reads out image information together with the first image printing conditions. The conditions concerning postprocessing, a layout, and information addition can be changed for each page. Postprocessing is then executed for each original in accordance with the result of changes. This makes it possible to make postprocessing settings including different types of postprocessing at once for a series of originals and execute postprocessing.

In addition, according to the second embodiment, set image printing conditions are selected and displayed on a page basis from a bird's-eye display portion 400 by using a display window serving as a setting device, and image information is displayed as a thumbnail, thereby allowing the operator to reliably check and change image printing conditions on a page basis without any confusion.

3. Third Embodiment of Checking and Setting of Image Printing Conditions

The third embodiment concerning checking and setting of image printing condition according to the present invention will be described below.

In the third embodiment, when copied images are to be printed on the basis of a set of original image data constituted by a plurality of pages, at least one of conditions concerning a layout, information addition, and postprocessing is set on a page basis by a setting device which sets image printing conditions.

The basic arrangement of the image printing apparatus which executes checking and setting of image printing conditions according to the third embodiment is the same as that of the first embodiment shown in FIG. 2.

A set of original image data constituted by a plurality of pages is input from a scanner unit 102, terminal 130, or the like to a controller 161. With regard to such original image data, at least one of conditions concerning postprocessing, information addition, and a layout can be set as an image printing condition on a page basis with respect to predetermined pages of a plurality pages.

An example of the sequence for setting image printing conditions in the third embodiment will be described below.

Figure 11A:
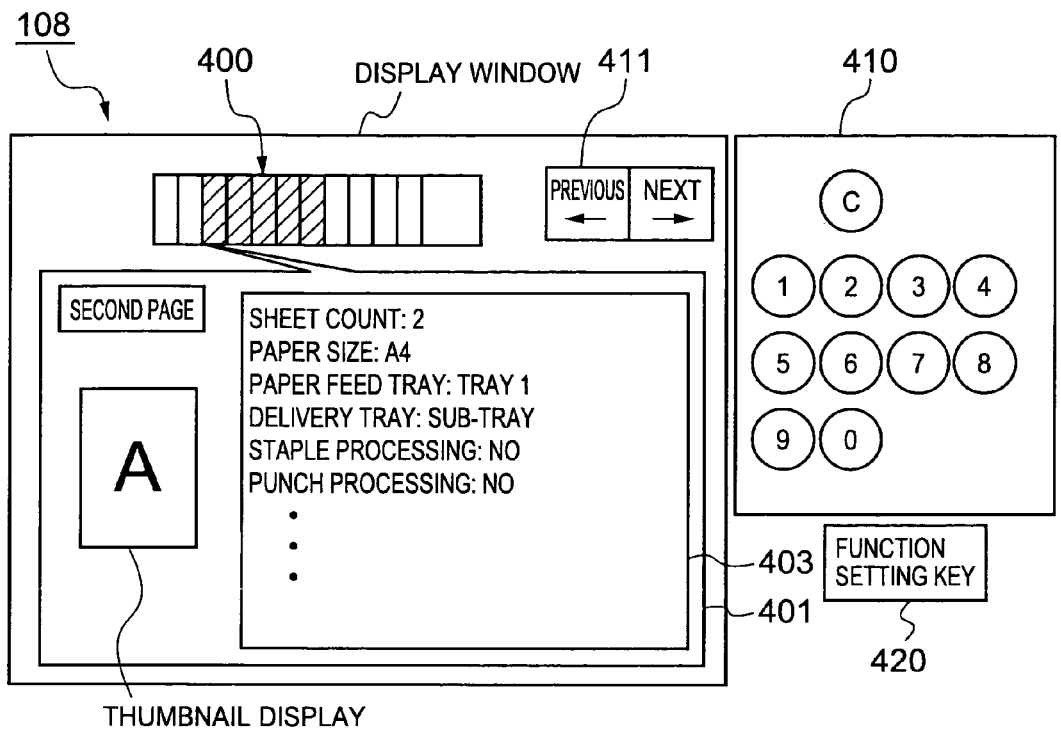
FIGS. 11A and 11B are views each showing the third embodiment of a display window associated with checking and setting of image printing conditions in the image printing apparatus of the present invention.

First of all, image printing conditions are displayed in a display window of an operation unit 108 on the basis of a set of original image data constituted by a plurality of pages. FIG. 11A shows a display window example on the operation unit 108. Note that portions denoted by the same reference numerals as in FIGS. 11A and 11B have the same functions in FIGS. 5A and 5B.

Referring to FIG. 11A, reference numeral 420 denotes a function setting key for setting conditions. This key is displayed on the operation unit, and operates when the operator touches the corresponding portion of the window.

Figure 11B:
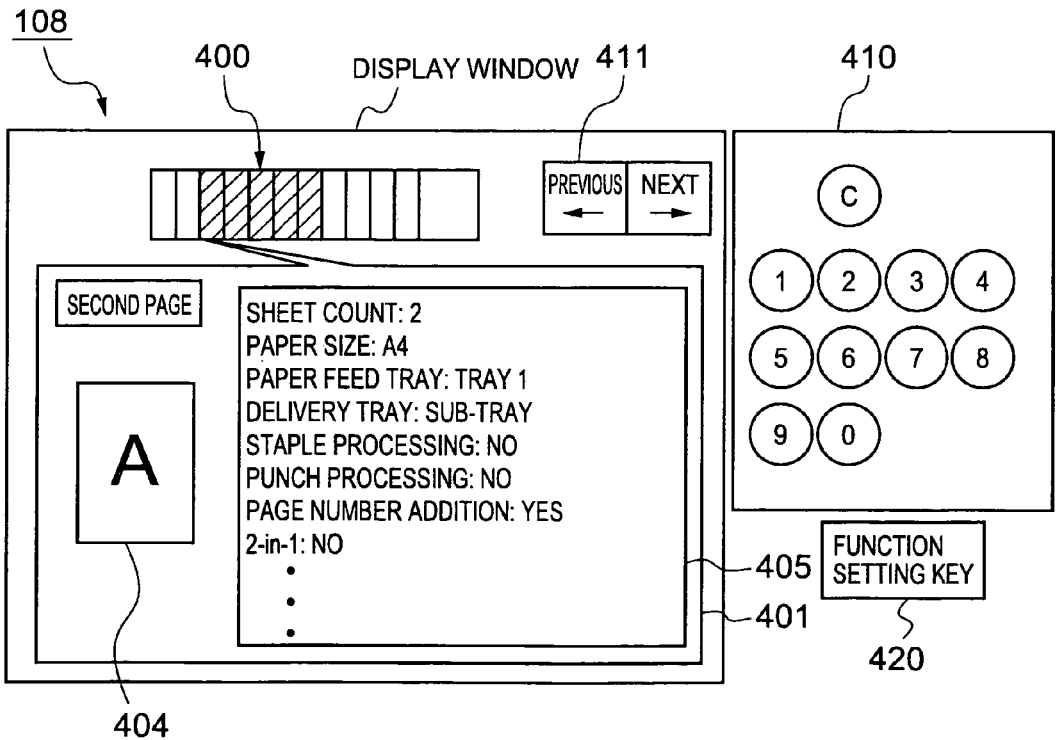

When the operator wants to set new image printing conditions for this page, he/she presses the function setting key 420. With this operation, conditions concerning staple processing and punch processing as examples of postprocessing, page number addition as an example of information addition, the 2-in-1 mode as an example of a layout are displayed as image printing conditions. The operator then set desired image printing conditions. As a result of image printing condition setting, for example, the conditions shown in FIG. 11B are set. In this manner, the operator can set at least one of conditions concerning postprocessing, information addition, and a layout on a page basis. The operator selects a page to which he/she wants to add an image printing condition by using a bird's-eye display portion 400. Through the above operation, for example, the settings shown in FIG. 11B are made.

An image printing unit performs image printing on the basis of the set image printing conditions. In the case shown in FIG. 11B, the 2-in-1 mode as an example of a layout is not set, and page number addition as an example of information addition is set. That is, these image printing conditions are equivalent to the image printing conditions described with reference to FIG. 8A to which a page number addition function is added. Therefore, image printing is performed basically in the same manner as in FIGS. 8A and 8B except for addition of a page number.

In the third embodiment, image printing conditions other than conditions concerning postprocessing, addition information, and a layout can also be set on a page basis, and hence the degree of freedom in output operation is increased.

In addition, a further improvement in convenience can be achieved by allowing set image printing conditions to be changed as in the case wherein the second image printing conditions are set in the second embodiment.

As described above, in the third embodiment, image printing conditions include conditions concerning postprocessing to be performed by a punch unit 110 and postprocessing device 120, a layout set by an image processing unit 112, and information addition, and image printing conditions can be set for each image information. Processing based on image printing conditions set for each original is then executed. This makes it possible to make postprocessing settings including different types of postprocessing at once for a series of originals and execute postprocessing.

In addition, according to the third embodiment, in setting operation, image printing conditions are selected and displayed on a page basis from the bird's-eye display portion 400 by using a display window serving as a setting device, and image information is displayed as a thumbnail, thereby allowing the operator to reliably check and change image printing conditions on a page basis without any confusion.

What is claimed is:

1. An image printing apparatus comprising:
a setting device for setting an image printing condition;
an image reader for reading original images of a plurality of pages on a page basis;
a read start button which causes the image reader to start reading the original images;
a storage device for storing the original images read by the image reader;
an image printing device for printing copied images based on the original images stored in the storage device in accordance with the image printing condition set by the setting device;
an image printing start button which instructs the image printing device to start printing the copied images; and
a controller for performing control to: (i) divide originals constituted by a bundle of pages within one job into a plurality of groups in printing copied images from the originals constituted by the bundle of pages within the one job, (ii) make the setting device set different image printing conditions for each group within the one job, (iii) make the image reader read images on originals for each group when the read start button is pressed, (iv) make the storage store the original images as the one job, and (v) make the image printing device print copied images for each group in accordance with the different image printing conditions set for each group within the one job with respect to all the groups within the one job when the image printing start button is pressed.

2. An apparatus according to claim 1, wherein the image printing condition includes a number of sheets on which the copied images are to be printed.

3. An apparatus according to claim 1, wherein the image printing condition includes paper delivery position information to be set when recording sheets on which the copied images are printed are to be delivered.

4. An apparatus according to claim 1, wherein the image printing condition includes delimiter information indicating an end of a same image printing condition.

5. An apparatus according to claim 4, wherein the controller causes a postprocessing device to perform processing on a booklet basis based on the delimiter information.

6. An apparatus according to claim 4, wherein the delimiter information indicates a last page in one loading operation when the original images of the plurality of pages are to be loaded by repeating the loading operation.

7. An apparatus according to claim 1, wherein the read start button and the image printing start button are formed by a single member.

8. An apparatus according to claim 4, wherein said setting device comprises a selecting device for selecting whether to perform control based on the delimiter information.

9. An apparatus according to claim 1, wherein the controller performs the image printing without stopping a print sequence on the page basis when the image printing conditions are input on the page basis.

* * * * *